United States Patent [19]

Khemani

[11] Patent Number: 6,020,393

[45] Date of Patent: Feb. 1, 2000

[54] BIODEGRADABLE FOAMABLE CO-POLYESTER COMPOSITIONS

[75] Inventor: Kishan Chand Khemani, Johnson City, Tenn.

[73] Assignee: Eastman Chemical Company, Kingsport, Tenn.

[21] Appl. No.: 08/967,250

[22] Filed: Nov. 5, 1997

Related U.S. Application Data

[60] Continuation of application No. 08/831,117, Apr. 1, 1997, abandoned, which is a division of application No. 08/761,152, Dec. 6, 1996, Pat. No. 5,661,193.
[60] Provisional application No. 60/017,239, May 10, 1996.

[51] Int. Cl.$^7$ ...................................................... C08J 9/00
[52] U.S. Cl. ........................... 521/182; 521/79; 528/193; 528/194; 528/272; 528/300; 528/306; 528/307; 528/308; 528/308.7
[58] Field of Search ...................... 521/182, 79; 528/193, 528/194, 272, 300, 306, 307, 308, 308.7

[56] References Cited

U.S. PATENT DOCUMENTS

| | | | |
|---|---|---|---|
| 2,012,267 | 8/1935 | Carothers | 260/8 |
| 3,553,157 | 1/1971 | Dijkstra et al. | 260/40 |
| 4,132,707 | 1/1979 | Borman | 528/273 |
| 4,145,466 | 3/1979 | Leslie et al. | 428/35 |
| 4,999,388 | 3/1991 | Okamoto | 523/400 |
| 5,000,991 | 3/1991 | Hayashi et al. | 428/36.5 |
| 5,110,844 | 5/1992 | Hayashi et al. | 521/182 |
| 5,128,383 | 7/1992 | Amano et al. | 521/182 |
| 5,134,028 | 7/1992 | Hayashi et al. | 428/332 |
| 5,288,764 | 2/1994 | Rotter et al. | 521/81 |
| 5,292,783 | 3/1994 | Buchanan et al. | 524/37 |
| 5,399,595 | 3/1995 | Sublett et al. | 521/182 |
| 5,446,079 | 8/1995 | Buchanan et al. | 524/41 |
| 5,519,066 | 5/1996 | McConnell et al. | 521/138 |

FOREIGN PATENT DOCUMENTS

| | | |
|---|---|---|
| 0 569 148 | 11/1993 | European Pat. Off. |
| 44 40 858 | 5/1996 | Germany |
| 91/02015 | 2/1991 | WIPO |

OTHER PUBLICATIONS

U. Seeliger, *Technische Kunststoffe*, ÖChem Z, pp. 13–15 (1996) (translation included).
United States Defensive Publication T954,005, Davis et al., Jan. 4, 1977.

*Primary Examiner*—Morton Foelak
*Attorney, Agent, or Firm*—Cheryl J. Tubach; Harry J. Gwinnell

[57] ABSTRACT

A branched random aliphatic-aromatic copolyesters suitable for foaming has increased melt viscosity and melt strength during extrusion and comprises repeating units of:

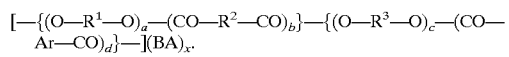

$$[-\{(O-R^1-O)_a-(CO-R^2-CO)_b\}-\{(O-R^3-O)_c-(CO-Ar-CO)_d\}-](BA)_x.$$

The mole percent of the acid components and diol components are each based on 100 mole percent. The aliphatic acid residue, $-CO-R^2-CO-$, is present in an amount b ranging from 30 to 95 percent and the aromatic acid residue, $-CO-Ar-CO-$, is present in an amount d ranging from 5 to 70 percent. The diol residues, $-O-R^1-O-$ and $-O-R^3-O-$, are present in an amount a of 0 to 100 mol percent and in an amount c of 100 to 0 mol percent, respectively. The branching agent, BA, is present in an amount x of 0.01 to 10 weight percent based on the total weight of acid residues, diol residues and branching agent. A foamed article of the branched random aliphatic-aromatic copolyesters is disclosed.

13 Claims, No Drawings

BIODEGRADABLE FOAMABLE CO-POLYESTER COMPOSITIONS

This is a continuation of pending prior application Ser. No. 08/831,117 filed on Apr. 1, 1997, abandoned which is a divisional of Ser. No. 08/761,152 filed on Dec. 6, 1996, now U.S. Pat. No. 5,661,193 which claims the benefit of U.S. Provisional Application Ser. No. 60/017,239 which was filed on May 10, 1996.

FIELD OF INVENTION

This invention relates to foamable copolyester compositions, and more particularly to such compositions that are biodegradable.

BACKGROUND OF THE INVENTION

Many polymeric materials are foamed to provide low density articles such as films, cups, food trays, decorative ribbons, and furniture parts. For example, polystyrene beads containing low boiling hydrocarbons such as pentane are formed into lightweight foamed cups for hot drinks such as coffee, tea, hot chocolate, and the like. Polypropylene can be extruded in the presence of blowing agents such as nitrogen or carbon dioxide gas to provide decorative films and ribbons for package wrappings. Also, polypropylene can be injection molded in the presence of blowing agents to form lightweight furniture such as lightweight chairs and table legs.

Polyesters and co-polyesters typically have a much higher density (e.g. about 1.3 g/cc) than other polymers. Therefore, foaming of polyester materials is desirable to decrease weight for their use in making molded parts, films, sheets, food trays, and the like. Such foamed articles also have better insulating properties than non-foamed parts. However, foaming polyesters is difficult. The low melt viscosity and low melt strength of typical poly(ethylene terephthalate) and related co-polyesters create polymer melts which do not adequately retain the bubbles of expanding gases during molding or extrusion operations. Providing polyesters which could be foamed with conventional foaming systems is therefore desirable. Moreover, providing such foamable polyesters that are biodegradable or environmentally non-persistent is even more desirable, especially for one time use items.

Polyesters with acceptable melt strength and melt viscosity for foaming have been prepared by treating preformed linear polyesters with monomeric branching agents such as multi-functional carboxylic acids, anhydrides or polyols to provide branched polyesters. These polyester compositions are disclosed in U.S. Pat. Nos. 3,553,157; 4,132,707; 4,145,466; 4,999,388; 5,000,991; 5,110,844; 5,128,383; 5,134,028; 5,288,764; 5,399,595 and 5,519,066.

Several classes of biodegradable polymers are known in the prior art. For example, cellulose and cellulose derivatives with a low degree of substitution (i.e. less than one) are biodegradable. Polyhydroxyalkanoates (PHA), such as polyhydroxybutyrate (PHB), polycaprolactone (PCL), or copolymers of polyhydroxybutyrate and polyhydroxyvalerate (PHBV), have also been reported to be biodegradable.

Biodegradable polyesters include those prepared from aliphatic diacids or the corresponding carboxylic ester of lower alcohols and diols. The aliphatic polyesters have been used in very few applications mainly because of their low melting points and low glass transition temperatures of generally less than 65° C. and −30° C., respectively. At room temperature, the physical form of many of the aliphatic polyesters is a thick, viscous liquid. Therefore, aliphatic polyesters have not been generally useful. To the contrary aromatic polyesters, such as poly(ethylene terephthalate), poly(cyclohexanedimethanol terephthalate), and poly (ethylene terephthalate-co-isophthalate), are commonly used materials yet are typically very resistant to biodegradation.

U.S. Pat. Nos. 5,292,783 and 5,446,079 disclose block and random linear copolyesters containing both aliphatic and aromatic structures which are biodegradable. However, these polymers are difficult to foam because of their low melt viscosity and melt strength. Heretofore, aliphatic-aromatic copolyesters have not been investigated for their foamability.

Thus, there exists a need in the art for a polyester composition having increased melt strength and viscosity suitable for foaming, yet also being biodegradable so as to be useful in disposable applications. Accordingly, it is to the provision of such an improved foamable polyester that the present invention is primarily directed.

SUMMARY OF THE INVENTION

A branched random aliphatic-aromatic copolyester suitable for foaming has increased melt viscosity and melt strength during extrusion and comprises repeating units of:

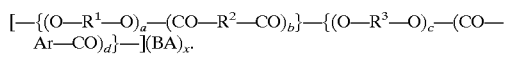

The aliphatic acid residue, —CO—R$^2$—CO—, is present in an amount b ranging from 30 to 95 percent and contains from 3 to 40 carbon atoms. The aromatic acid residue, —CO—Ar—CO—, is present in an amount d ranging from 5 to 70 percent and contains from 8 to 40 carbon atoms. The diol residues, —O—R$^1$—O— and —O—R$^3$—O—, are present in an amount a of 0 to 100 mol percent and in an amount c of 100 to 0 mol percent, respectively, and contain from 2 to 20 carbon atoms. The mole percent of the acid components and diol components are each based on 100 mole percent. The branching agent, BA, is present in an amount x of 0.01 to 10 weight percent based on the total weight of acid residues, diol residues and branching agent. A foamed article of the branched random aliphatic-aromatic copolyester is disclosed.

DESCRIPTION OF THE INVENTION

Polyfunctional branching agents such as pentaerythritol, trimethylol propane, 1,2,4-butanetriol, trimellitic acid and pyromellitic acid are used as co-monomers to produce branched random aliphatic-aromatic copolyesters. These branched copolyesters have high melt strength and melt viscosities and are foamable upon gas injection in an extruder. Their rheological properties are adequate to aid in cell formation, which is initiated by a cell nucleating agent, and in the expansion necessary for density reduction.

The branched random aliphatic-aromatic copolyesters of the present invention comprise repeating units of:

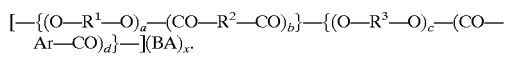

The aliphatic acid residue, —CO—R$^2$—CO—, is present in an amount b ranging from 30 to 95 mol percent, preferably 55 to 60 mol percent, and contains 3 to 40 carbon atoms, preferably 3 to 12 carbon atoms. The aromatic acid residue, —CO—Ar—CO—, is present in an amount d ranging from 5 to 70 mol percent, preferably 40 to 45 mol percent, and contains from 8 to 40 carbon atoms, preferably 8 to 14 carbon atoms. The diol residues, —O—$R^1$—O— and —O—$R^3$—O—, which contain from 2 to 20 carbon atoms are present in an amount a of 0 to 100 mol percent and in an amount c of 100 to 0 mol percent, respectively. The mole percent of the acid components and diol components are each based on 100 mole percent.

The aliphatic acid components are preferably selected from the group consisting of malonic, succinic, glutaric, adipic, pimelic, azelaic, sebacic, fumaric, 2,2-dimethyl glutaric, suberic, 1,3-cyclopentane-dicarboxylic, 1,4-cyclohexanedicarboxylic, 1,3-cyclohexanedicarboxylic, diglycolic, itaconic, maleic and 2,5-norbornanedicarboxylic. Hydroxy acids such as 4-(hydroxymethyl) cyclohexanecarboxylic acid, hydroxypivalic acid, 6-hydroxyhexanoic acid, glycolic acid, lactic acid and ester forming derivations thereof may also be used as aliphatic acid components to make these co-polyesters.

The aromatic acid components are preferably selected from the group consisting of 1,4-terephthalic, 1,3-terephthalic, 2,6-napthoic, 1,5-naphthoic, ester forming derivatives thereof and combinations thereof.

The diol components are preferably selected from the group consisting of ethylene glycol, diethylene glycol, propylene glycol, 1,3-propanediol, 2,2-dimethyl 1,3-propanediol, 1,3-butanediol, 1,4-butanediol, 1,5-pentanediol, 1,6-hexanediol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, tetraethylene glycol, and combinations thereof. The diol components may be the same or different.

The branching agent is represented by "$(BA)_x$" wherein "x" is the weight percent of the branching agent. The weight percent ranges from 0.01 to 10 percent, preferably 0.1 to 1.0 weight percent.

The branching agent preferably has a weight average molecular weight of about 50–5000, more preferably 92–3000, and a functionality of about 3–6. The branching agent may be a polyol having 3–6 hydroxyl groups, a polycarboxylic acid having 3 or 4 carboxyl groups or a hydroxy acid having a total of 3–6 hydroxyl and carboxyl groups.

Representative low molecular weight polyols that function as branching agents include glycerol, trimethylolpropane, 1,2,4-butanetriol, pentaerythritol, 1,2,6-hexanetriol, sorbitol, 1,1,4,4-tetrakis (hydroxymethyl) cyclohexane, tris(2-hydroxyethyl) isocyanurate, and dipentaerythritol. Particular branching agent examples of higher molecular weight polyols (MW 400–3000) are triols derived by condensing alkylene oxides having 2–3 carbons, such as ethylene oxide and propylene oxide with polyol initiators.

Representative polycarboxylic acids that may be used as branching agents include hemimellitic acid, trimellitic acid, trimesic acid, pyromellitic acid, benzene tetracarboxylic acid, benzophenone tetracarboxylic acid, 1,1,2,2-ethanetetracarboxylic acid, 1,1,2-ethanetricarboxylic acid, 1,3,5-pentane-tricarboxylic acid, and 1,2,3,4-cyclopentanetetra-carboxylic acid. Although the acids may be used as such, preferably they are used in the form of their lower alkyl esters or their cyclic anhydrides in those instances where cyclic anhydrides can be formed.

Representative hydroxy acids as branching agents include malic acid, citric acid, tartaric acid, 3-hydroxyglutaric acid, mucic acid, trihydroxyglutaric acid, and 4-(beta-hydroxyethyl)phthalic acid. Such hydroxy acids contain a combination of 3 or more hydroxyl and carboxyl groups.

Especially preferred branching agents include trimellitic acid, trimesic acid, pentaerythritol, trimethylol propane and 1,2,4-butanetriol.

The preparation of polyesters and copolyesters is well known in the art, such as disclosed in U.S. Pat. No. 2,012,267. Such reactions are typically operated at temperatures from 150° C. to 300° C. in the presence of polycondensation catalysts such as titanium isopropoxide, manganese diacetate, antimony oxide, dibutyl tin diacetate, zinc chloride, or combinations thereof. The catalysts are typically employed in amounts between 10 to 1000 parts per million (ppm), based on total weight of the reactants.

A branched random aliphatic-aromatic copolyester of the present invention is poly(tetramethylene adipate-co-terephthalate) branched with 0.5 weight percent pentaerythritol and containing 43 mole percent terephthalate. This copolyester is produced when dimethyladipate, dimethyl terephthalate, pentaerythritol and 1,4-butanediol are heated at 190° C. for 1 hour, 200° C. for 2 hours, 210° C. for 1 hour, then at 250° C. for 1.5 hours under vacuum in the presence of 100 ppm of Ti present initially as $Ti(O^iPr)_4$. The copolyester is typically pelletized after formation for use in extrusion foaming.

Another branched random copolyester of the present invention is poly(tetramethylene adipate-co-terephthalate) branched with 0.3 weight percent pyromellitic dianydride and containing 43 mole percent terephthalate. This copolyester is produced via reactive extrusion of linear poly (tetramethylene adipate-co-terephthalate) with pyromellitic dianhydride using an extruder. This copolyester may be foamed directly during the extrusion or pelletized for later use in foaming.

The branched aliphatic-aromatic copolyester pellets are dried in a conventional or vacuum oven and are extruded or molded by conventional techniques. These branched copolyesters are useful in the manufacture of films, tubes, foams, blow molded objects, extrusion coated materials, food packaging containers, injection molded parts and the like. While these branched copolyesters may be used in many molding or extrusion applications such as injection molding, injection blow molding, extrusion and extrusion blow molding to form non-foamed products, these branched copolyesters are preferably used to prepare foamed articles such as for use in the food packaging, construction, auto or graphic arts industries.

Foaming polymers is a process well known in the art. Conventional extrusion techniques may be used to foam the branched copolyester of the present invention, preferably to densities less than 1.1 g/cc, more preferably, densities of less than about 0.2 g/cc. A typical equipment configuration for foam extrusion processes consists of a single extruder, a liquid or gas blowing agent injection system, a die to shape the foam, a cooling unit such as a mandrel and a take-up system to collect the extruded foamed product. The extruder preferably has a high length to diameter ratio with a typical L/D of 30:1. The blowing agent injection system typically comprises a pump or gas cylinder with injector valves. In such a process a two-stage screw is typically used.

The branched copolyester and a cell nucleating agent are added to the extruder feed hopper (or hoppers) and fed to the feed section of the screw. The branched copolyester and the nucleating agent are melted and compounded in the transition section of the screw.

Any nucleating agent may be used as long as the nucleating agent is capable of providing a nucleation site. Suitable nucleating agents include, for example, titanium dioxide, talc, chopped fiber glass, alumina, clay, and fumed silica. A combination of nucleating agents may also be added.

The blowing agent is injected in the transition section of the screw. Blowing agents are used in amounts of about 0.01 to about 20 weight percent, based on the total weight of the branched copolyester and blowing agent, to obtain the desired high expansion ratios. Concentrations of about 0.1 to about 5 weight percent are typical.

Suitable blowing agents include inert gases, such as nitrogen and carbon dioxide; hydrocarbons boiling at about −40° C. to about 45° C., such as propane, butane, and pentane; hydrofluorocarbons, such as 1,1-difluoroethane and 1,1,1,2-tetrafluoroethane; hydrochlorofluorocarbons; and gas liberating chemical blowing agents, such as sodium bicarbonate, a combination of citric acid and sodium bicarbonate, a combination of citric acid and sodium carbonate, azodicarbonamide, and various endothermic blowing agents which release $CO_2$ and/or $N_2$. Mixtures of blowing agents may also be used.

The branched copolyester melt containing a specific mixed-in ratio of dissolved and dispersed blowing agent, the amount of which depends upon type of blowing agent, temperature, pressure and other specific extrusion conditions, is then extruded through the die whereupon the melt expands and is optionally shaped, cooled and collected. The temperature profile on the extruder is chosen such that the branched polyester is in a molten state prior to the injection of the blowing agent. The temperatures of the extruder zones beyond the gas-injection port, the optional static-mixer section and then the die are generally cooler to adequately cool the gas-laden melt allowing for expansion without cell-coalescence upon exiting the die.

A second more commonly used foam extrusion process employs two extruders operating in tandem. The branched copolyester and nucleating agent are melted and mixed in a primary extruder which is typically equipped with a high shear mixing screw. The gas or liquid blowing agent is normally injected near the end of the primary extruder. The melt/blowing agent composition is then transferred by means of a static heated tube, i.e. the crossover section, to the feed section of the secondary extruder. The main purpose of the secondary extruder is to cool the gas-laden melt to an optimum melt temperature and pressure while transferring it to an annular die for foam formation without cell-coalescence upon exiting. For this reason, typically the secondary extruder is of a much larger diameter than the primary extruder. The tandem extruder configuration normally allows for excellent control of process variables.

Various screw configurations and designs can be used to prepare the foamed branched copolyesters. Mixers can be added to the screw or as independent components to disperse additives, nucleation agents, and blowing agents. Twin screw extruders or satellite extruders may also be used. Satellite extruders may be used for co-extrusion of a thin, solid, non-foamed, polymer layer on the foamed polyester sheet. Additionally, thin non-foamed layers of polymers may also be applied on the foamed sheet through a separate lamination process.

Biodegradable polymers are comprised of components which are reduced in film or fiber strength by microbial catalyzed degradation. The biodegradable polymers are reduced to monomers or short chains which are then assimilated by the microbes. In an aerobic environment, these monomers or short chains are ultimately oxidized to $CO_2$, $H_2O$, and new cell biomass. In an anaerobic environment the monomers or short chains are ultimately oxidized to $CO_2$, $H_2$, acetate, methane, and cell biomass. Successful biodegradation requires direct physical contact between the biodegradable polymers and the active microbial population or the enzymes produced by the active microbial population. Moreover, certain minimal physical and chemical requirements such as suitable pH, temperature, oxygen concentration, proper nutrients, and moisture level must be met.

Many of the branched copolyesters described in the present invention degrade in a composting environment and hence are useful as environmentally nonpersistent foamed materials. Thin films (approximately two mil thickness) of poly(tetramethylene adipate-co-terephthalates) branched with 0.1 and 0.5 weight percent of pentaerythritol were evaluated for biodegradability as indicated by cracking or fragmentation. The films were placed in a petri dish on "lawns" of a white fungus, which had been isolated from grass and grown under pH control using proper nutrients. The petri dish provided an aerobic environment at room temperature with relatively high humidity and $CO_2$ concentration. As a control, two mil thin films of linear unbranched poly(tetramethylene (43:57) adipate-co-terephthalate) were placed along side on the same "lawn". The control films cracked and fragmented in 2.56 days normalized to per mil basis. The branched copolyester films containing 0.1 and 0.5 weight percent pentaerythritol degraded to the same extent in 2.69 and 3.68 days, respectively. The method of preparing these branched copolyesters is given in the examples below.

Optionally, organic fillers such as starch, woodflour and organic fibers (for example, jute or hemp) may be added to these foamable branched copolyesters during the foam processing step in order to (1) make a stiffer and easier to thermoform foam due to reduced sticking to the mold cavities and (2) enhance the biodegradability of the finished foam product or article. Use of such materials for this purpose is well known in the art.

This invention will be further illustrated by a consideration of the following examples, which are intended to be exemplary of the invention. All parts and percentages in the examples are on a mol percent basis unless otherwise stated.

EXAMPLES

The materials and testing procedures used for the results shown herein in the examples were as follows.

1. Inherent viscosity (I.V.) was measured at 25° C. using 0.50 grams of polymer per 100 mL of a solvent consisting of 60 percent by weight phenol and 40 percent by weight tetrachloroethane.

2. Melt Strength and Die Swell were determined according to ASTM D3835 measured at 280° C. The molten branched copolyester was extruded downward through a die 0.1 inch in diameter and 0.25 inches long at a shear rate of 20 $second^{-1}$ using an Instron rheometer. The extrudate was allowed to fall freely. Die Swell was determined by measuring the diameter of the extrudate immediately outside the orifice and dividing the diameter measurement by the diameter of the orifice. Die Swell was reported as percent Die Swell. The diameter of the end of a six inch length of extrudate, measured from the orifice of the die, was measured. The percent Melt Strength was determined from the formula:

$$\frac{D - 0.1}{0.1} \times 100$$

wherein D is the diameter in inches of the extrudate supporting a six inch length of extrudate. If D is less than 0.1 inch, the Melt Strength is a negative number since there is no increase in the diameter of the extrudate. If D is greater than 0.1 inch, the Melt Strength is a positive number.

3. Melt viscosity was measured according to ASTM D4440 at zero shear and 280° C.
4. The mol percentages of the diol and acid residues were determined by gas chromatography or NMR.
5. Weight Average Molecular weight was measured by gel permeation chromatography (GPC).
6. The melting points were measured by differential scanning colorimetry (DSC) under nitrogen and using a scan rate of 20° C./minute.

Example 1

This example illustrates the synthesis and physical properties of random poly(tetramethylene (40:60) glutarate-co-terephthalate) branched with 0.35 weight percent (wt %) pentaerythritol.

A polymer synthesis vessel was charged with 60 mol % dimethyl terephthalate, 40 mol % dimethyl glutarate, 100 mol % 1,4-butanediol, and 0.35 wt % of pentaerythritol branching agent. Added thereto was 100 ppm of titanium isopropoxide catalyst (solution in butanol). The mixture was purged with nitrogen under vigorous agitation and heated initially to 190° C. After one hour the temperature was raised to 200° C., and the ester exchange/esterification continued for another hour. After an additional two hours at 210° C., the ester exchange/esterification process was completed. The polycondensation was then conducted at 250° C. under a vacuum of approximately 0.1 mm of Hg. At the end of 1 hour of polycondensation, the polymer had an I.V. of 0.96 dL/g. The semi-crystalline white polymer had a DSC melting point of 148° C. and a crystallization temperature of 82.6° C. (from glass) and of 75.1° C. (from melt). The polymer had a t melt strength of +23% and a % die swell of +116% at 170° C. For comparison, an unbranched sample of this same polymer, poly(tetramethylene (40:60) glutarate-co-terephthalate) (I.V. 1.1 dL/g), had a % melt strength of −64% and a % die swell of −4% at 170° C.

Example 2

This example illustrates the synthesis and physical properties of random poly(tetramethylene (43:57) adipate-co-terephthalate) branched with 0.5 wt % pentaerythritol.

A polymer synthesis vessel was charged with 57 mol % dimethyl terephthalate, 43 mol % dimethyladipate, 100 mol % 1,4-butanediol and 0.5 weight % of pentaerythritol branching agent. Added thereto was 100 ppm of titanium isopropoxide catalyst (solution in Butanol). The mixture was purged with nitrogen under vigorous agitation and heated initially to 190° C. After one hour the temperature was raised to 200° C., and the ester exchange/esterification continued for 2 more hours. After an additional hour at 210° C., the ester exchange/esterification process was completed. The polycondensation was then conducted at 250° C. under a vacuum of approximately 0.1 mm of Hg. At the end of 1.5 hours of polycondensation, the polymer had an I.V. of 0.98 dL/g. The semi-crystalline white polymer had a DSC melting point of 109° C. and a crystallization temperature of 45.6° C. (from glass) and of 34.4° C. (from melt). The polymer had a % melt strength of +40% and a % die swell of +149% at 130° C. This branched copolyester had a GPC weight average molecular weight of 84021, a poly-dispersity of 4.78, a Mz/Mn ratio of 17.75 and a zero shear melt viscosity of $3.27 \times 10^5$ poise at 130° C. For comparison, an unbranched sample of this same polymer, poly(tetramethylene (43:57) adipate-co-terephthalate) (IV 1.11 dL/g), had a % melt strength of −25%, a % die swell of +34% at 130° C. and a zero shear melt viscosity of $5.71 \times 10^4$ poise at 130° C.

Using the above described procedure, 100 lbs of the above branched copolyester was prepared in the form of ⅛" pellets for extrusion foaming experiments. The polymer was dried at 60° C. in a dehumidifying dryer and then extruded in a single screw extruder at a melt temperature of 120° C. Powder talc (Polar Minerals Inc., Product #9102, median particle size 2–3 microns) was fed into the feed throat of the extruder using a powder feeder attachment at a rate of 0.35 wt % based on the melt output. The diameter of the screw was 40 mm, L/D ratio was 30, and the nozzle die at the end of the extruder had a bore of 5 mm. Nitrogen blowing agent at 1.5 wt % based on the melt output was injected into the mid-point of the extruder. A foamed rod was produced through the nozzle of the die. The foamed road had good smooth surface and a uniform cell structure with all cells being closed. The density of the foamed rod was 0.75 g/cc.

For comparison, these foaming experiments were attempted using the unbranched poly(tetramethylene (43:57) adipate-co-terephthalate) (IV 1.11 dL/g). The surface of the foamed rod was quite rough, and the foam cell structure quite irregular with numerous large open cells visible to the naked eye. These results were caused by the very low melt strength and melt viscosity of this unbranched copolyester.

Example 3

This example illustrates the synthesis and physical properties of random poly-(tetramethylene (43:57) adipate-co-terephthalate) branched with 0.1 wt % pentaerythritol.

A polymer synthesis vessel was charged with 57 mol % dimethyl terephthalate, 43 mol % dimethyl adipate, 100 mol % 1,4-butanediol and 0.1 weight % of pentaerythritol branching agent. Added thereto was 30 ppm of titanium isopropoxide catalyst (solution in Butanol). The mixture was purged with nitrogen under vigorous agitation and heated initially to 190° C. After one hour the temperature was raised to 200° C., and the ester exchange/esterification continued for 2 more hours. After an additional 2.5 hours at 210° C. the ester exchange/esterification process was completed. The polycondensation was then conducted at 250° C. under a vacuum of approximately 0.1 mm of Hg. At the end of 1 hour of polycondensation, the polymer had an I.V. of 0.85 dL/g. The semi-crystalline white polymer had a DSC melting point of 113.6° C. and a crystallization temperature of 42.5° C. (from glass) and of 47.6° C. (from melt). The polymer had a % melt strength of −48% and a % die swell of +3% at 130° C. This branched copolyester had a GPC weight average molecular weight of 48108, a polydispersity of 2.33 and a Mz/Mn ration of 4.47. For comparison, an unbranched sample of this same polymer, poly(tetramethylene (43:57) adipate-co-terephthalate) (IV 1.11 dL/g), had a t melt strength of −25% and a % die swell of +34% at 130° C.

The present invention has provided a branched random aliphatic-aromatic copolyester that is suitable for foaming. A significant increase in melt viscosity and melt strength is obtained in the branched copolyesters as compared to the same unbranched copolyesters.

The invention has been described in detail with particular reference to preferred embodiments thereof, but it will be understood that variations and modifications can be effected within the spirit and scope of the invention.

I claim:

1. A foamable branched random aliphatic-aromatic copolyester having increased melt viscosity and melt strength during extrusion and comprising repeating units of:

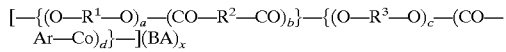

wherein (1) acid components are present in an amount of 100 mol percent comprising (a) —CO—$R^2$—CO—, an aliphatic acid residue present in an amount b of 30 to 95 mol percent and containing 3 to 40 carbon atoms and (b) —CO—Ar—CO—, an aromatic acid residue present in an amount d of 5 to 70 mol percent and containing 8 to 40 carbon atoms; and (2) diol components are present in an amount of 100 mol percent comprising (a) —O—$R^1$—O— present in an amount a of 0 to 100 mol percent and (b) —O—$R^3$—O— present in an amount c of 100 to 0 mol percent, both (a) and (b) containing 2 to 20 carbon atoms; and (3) BA is a branching agent present in an amount x of 0.01 to 10 weight percent based on the total weight of (1), (2) and (3).

2. The branched random aliphatic-aromatic copolyester of claim 1 wherein b is from 55 to 60 mol percent and d is from 40 to 45 mole percent.

3. The branched random aliphatic-aromatic copolyester of claim 1 wherein the acid components are dicarboxylic acids selected from the group consisting of malonic, succinic, glutaric, adipic, pimelic, azelaic, sebacic, fumaric, 2,2-dimethyl glutaric, suberic, 1,3-cyclopentane-dicarboxylic, 1,4-cyclohexanedicarboxylic, 1,3-cyclohexanedicarboxylic, diglycolic, itaconic, maleic, 2,5-norbornanedicarboxylic, 1,4-terephthalic, 1,3-terephthalic, 2,6-napthoic, 1,5-naphthoic, ester forming derivatives thereof and combinations thereof.

4. The branched random aliphatic-aromatic copolyester of claim 1 wherein the acid components are hydroxy acids selected from the group consisting of 4-(hydroxymethyl)-cyclohexanecarboxylic acid, hydroxypivalic acid, 6-hydroxyhexanoic acid, glycolic acid, lactic acid, and ester forming derivatives thereof.

5. The branched random aliphatic-aromatic copolyester of claim 1 wherein the diol components are selected from the group consisting of ethylene glycol, diethylene glycol, propylene glycol, 1,3-propanediol, 2,2-dimethyl 1,3-propanediol, 1,3-butanediol, 1,4-butanediol, 1,5-pentanediol, 1,6-hexanediol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, tetraethylene glycol, and combinations thereof.

6. The branched random aliphatic-aromatic copolyester of claim 1 wherein the branching agent is present in an amount of 0.1 to 1.0 weight percent.

7. The branched random aliphatic-aromatic copolyester of claim 1 wherein the branching agent has a weight average molecular weight of about 50–5000.

8. The branched random aliphatic-aromatic copolyester of claim 7 wherein the weight average molecular weight is 92–3000 and the branching agent has a functionality of 3–6.

9. The branched random aliphatic-aromatic copolyester of claim 1 wherein the branching agent is selected from the group consisting of a polyol having 3–6 hydroxyl groups, a polycarboxylic acid having 3 or 4 carboxyl groups, esters or anhydrides of the polycarboxylic acid, and a hydroxy acid having a total of 3–6 hydroxyl and carboxyl groups.

10. The branched random aliphatic-aromatic copolyester of claim 9 wherein the polyol is selected from the group consisting of glycerol, trimethylolpropane, 1,2,4-butanetriol, pentaerythritol, 1,2,6-hexanetriol, sorbitol, 1,1,4,4-tetrakis (hydroxymethyl)cyclohexane, tris(2-hydroxyethyl) isocyanurate, and dipentaerythritol.

11. The branched random aliphatic-aromatic copolyester of claim 9 wherein the polycarboxylic acid is selected from the group consisting of hemimellitic acid, trimellitic acid, trimesic acid, pyromellitic acid, benzene tetracarboxylic acid, benzophenone tetracarboxylic acid, 1,1,2,2-ethanetetracarboxylic acid, 1,1,2-ethanetricarboxylic acid, 1,3,5-pentane-tricarboxylic acid, and 1,2,3,4-cyclopentanetetra-carboxylic acid.

12. The branched random aliphatic-aromatic copolyester of claim 9 wherein the hydroxy acid is selected from the group consisting of malic acid, citric acid, tartaric acid, 3-hydroxyglutaric acid, mucic acid, trihydroxyglutaric acid, and 4-(beta-hydroxy-ethyl)phthalic acid.

13. The branched random aliphatic-aromatic copolyester of claim 9 wherein the branching agent is selected from the group consisting of trimellitic acid, trimesic acid, pentaerythritol, trimethylol propane and 1,2,4-butanetriol.

* * * * *